United States Patent [19]

Chin et al.

[11] 4,233,016
[45] Nov. 11, 1980

[54] FOOD PRODUCT FORMING APPARATUS

[75] Inventors: Joseph T. Chin, Elmhurst, N.Y.; Arthur M. Hochhauser, Allentown, Pa.; John P. McCarthy, Huntington, N.Y.

[73] Assignee: DCA Food Industries, Inc., New York, N.Y.

[21] Appl. No.: 946,755

[22] Filed: Sep. 28, 1978

[51] Int. Cl.³ .............................................. A21C 5/00
[52] U.S. Cl. .................................... 425/288; 99/516; 425/96; 425/104; 425/202; 425/287
[58] Field of Search ............... 425/287, 288, 202, 200, 425/209, 93, 96, 104, 106

[56] References Cited

U.S. PATENT DOCUMENTS

| Re. 25,536 | 3/1964 | Thompson | 425/288 |
|---|---|---|---|
| 1,793,207 | 2/1931 | Bergner | 425/287 |
| 1,866,061 | 7/1932 | Schoel | 425/287 |
| 1,909,449 | 5/1933 | Belshaw | 425/287 |
| 2,246,759 | 6/1941 | Roth et al. | 425/288 |
| 2,953,106 | 9/1960 | Jacobs | 425/96 |
| 3,452,687 | 7/1969 | Kaneko et al. | 425/288 |
| 3,814,560 | 6/1974 | Smadar et al. | 425/288 |

FOREIGN PATENT DOCUMENTS 2051915  6/1971  Fed. Rep. of Germany ........... 425/288

*Primary Examiner*—Melvyn I. Marquis
*Assistant Examiner*—Arthur H. Koeckert
*Attorney, Agent, or Firm*—Philip H. Gottfried

[57] ABSTRACT

A forming device for providing a substantially cylindrical side wall on the exteriors of each one of successive food product mixtures or slurries discharged from a nozzle orifice in a food product apparatus. The device is mountable on the nozzle and enables a liquid substance to be uniformly directed against each of the formed slurries to envelop them and to aid their release from the nozzle.

9 Claims, 7 Drawing Figures

FIG. 6.
FIG. 5.
FIG. 7.
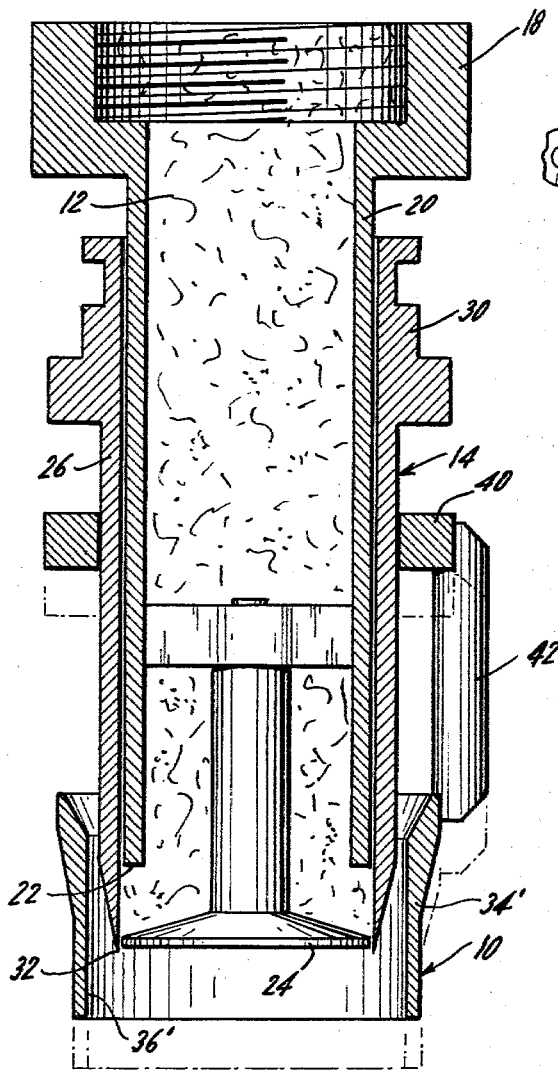
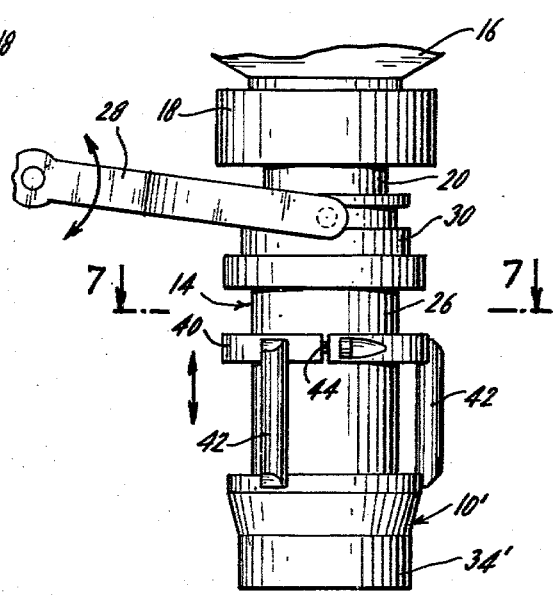
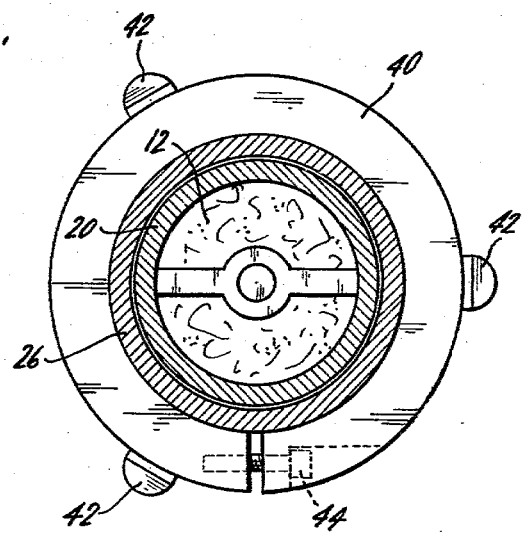

FOOD PRODUCT FORMING APPARATUS

DESCRIPTION OF THE INVENTION

The present invention relates generally to apparatus for shaping food products, and more particularly to a forming device which can be mounted adjacent to a nozzle orifice through which slurries or mixtures of the food product are discharged by food product apparatus.

It is generally known in the art to provide molding or forming members adjacent to a nozzle orifice through which a food mixture is discharged so as to form the mixture into a particular shape prior to its being fried or otherwise processed. For example, U.S. Pat. No. 3,452,687 shows apparatus for molding a filled dough mixture by way of a pair of movable split molding bowls. The bowls are brought together in the vicinity of a discharge opening in a pipe to receive the mixture and aid in its molding and removal from the opening. The molding cups themselves are substantially curved or bent so that their edges closely encircle a cutting sleeve mounted about the pipe, the bowls being moved up and down along the sleeve by outside means during the dough forming and removal operations.

A doughnut forming device is also shown in U.S. Pat. No. 1,866,061, the device being in the form of a bell mouth joined to a dough discharge nozzle above the nozzle opening so as to define an annular region within which the discharged dough mixture is received.

It will be appreciated, however, that the forming devices described above are intended and designed to provide toroid shaped dough products having a generally circular cross section through their bodies. However, with the increasing popularity of food products composed of mixtures or slurries of elemental food pieces such as diced onions, for example, there has arisen a need for a forming device which can be used in association with food product apparatus that will form other than toroidal or doughnut shaped food products, as the product mixture is discharged by a nozzle in the apparatus.

In the case of onion rings formed from an onion mash, it is highly desirable that the cross section of the final onion ring product be rectangular, rather than curved, so as to resemble a natural onion ring having cylindrically shaped inside and outside walls. Yet, it will be appreciated that none of the above-mentioned doughnut forming devices could be satisfactorily used to provide such walls on food products discharged in slurry form from a nozzle opening, and still enable an easy release of the formed products away from the nozzle. For example, a problem would result if the dough forming devices of the known prior art were applied to food product apparatus such as that of U.S. Pat. No. 3,814,560, which provides onion ring products from a slurry of onion mash. In this apparatus, onion mash slurries are successively discharged from an opening at the base of a nozzle impinging against a cutter disc extending laterally of the nozzle base, thereby directing the mash outwardly and sideways from an opening between the cutter disc and a cutting sleeve. A liquid gel forming substance is directed down along side the cutting sleeve to envelope each of the discharged slurries as they are cut free by the sleeve. Accordingly, use of dough forming devices similar to those discussed which are joined to or closely encircle a nozzle above its discharge opening, would obstruct the flow of the liquid gel before reaching the food slurries as they appear at the nozzle base. This would seriously impair the operation of the apparatus.

It is an object of the present invention to overcome the above and other shortcomings in prior art food product forming apparatus.

It is another object of the present invention to provide a food product forming apparatus capable of providing a substantially cylindrical side wall on each of successively discharged food product slurries such as an onion mash, so as to yield a shape more typical of that of the natural food.

It is yet another object of the present invention to provide a food product forming device which can be mounted to a nozzle through which a slurry or mixture of the food product is discharged.

It is a still further object of the present invention to provide a food product forming device for use with apparatus of the type in which a liquid substance is directed against successively discharged food product slurries or mixtures without impairment of the operation of the apparatus.

In accordance with the present invention, there is provided a forming device for forming a substantially cylindrical outside wall on the exteriors of food product slurries successively discharged from an opening at one end of a nozzle. The device includes a member having a cylindrical inner wall for forming the outside walls on the discharged slurries, the member inner wall and the nozzle opening defining a region within which each of the slurries are formed. The forming region is unobstructed in a direction parallel to the inner wall of the member so the formed slurries can be removed in that direction from the nozzle and the forming device.

The above brief description, as well as further objects, features and advantages of the present invention will be more fully understood by reference to the following detailed description of presently preferred but, nonetheless, illustrative embodiment in accordance with the present invention, when taken in conjunction with the accompanying drawings, wherein:

FIG. 5 is a view similar to FIG. 1, showing a forming device mounted on the nozzle cutter sleeve by way of a collar member secured to the sleeve in accordance with the present invention;

Figure 2:
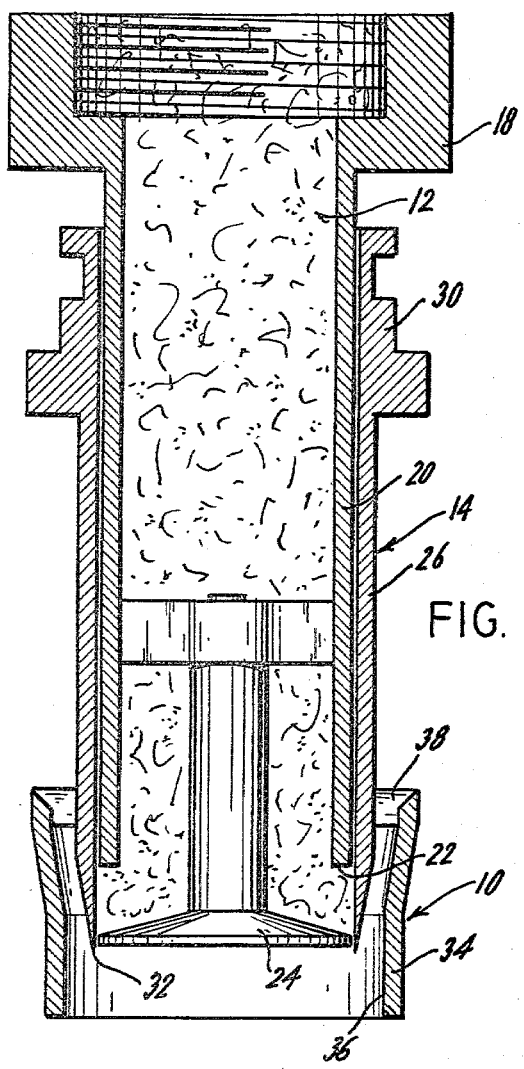
FIG. 2 is an enlarged partial cross sectional view of the nozzle and the forming device of the present invention as taken substantially along line 2—2 in FIG. 1, showing the food product slurry conducted through the nozzle toward a discharge orifice at the base of the nozzle, the orifice being closed off by a cutter sleeve.

FIG. 6 is an enlarged partial cross sectional view of the nozzle and the forming device of the present invention mounted to the cutter sleeve and showing the food product slurry conducted toward the nozzle orifice as in FIG. 2, and FIG. 7 is an enlarged top cross sectional view of the forming device of FIG. 5 on the cutter sleeve according to the present invention, as taken substantially along line 7—7 in FIG. 5 and looking in the direction of the arrows.

Figure 1:
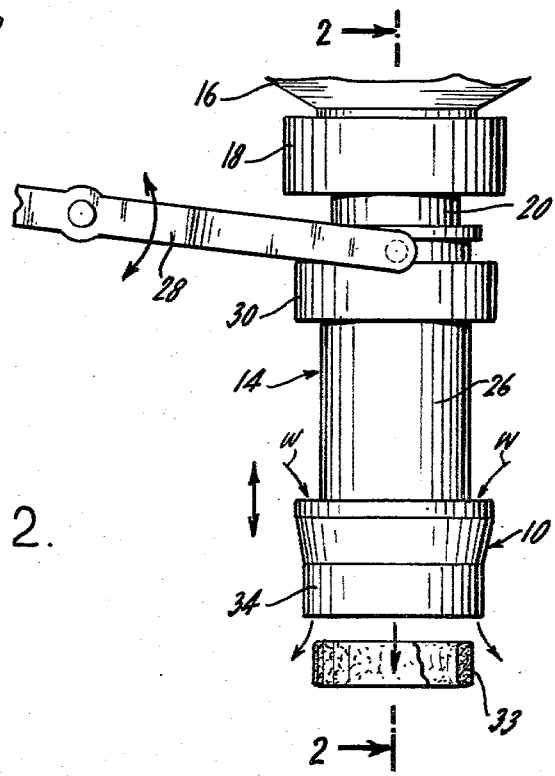
FIG. 1 is a side elevational view with parts broken away showing a nozzle extending from food product apparatus, and a forming device mounted on the nozzle to provide cylindrical side walls on a food product discharged from the nozzle, in accordance with the present invention.

Referring now specifically to the drawings, and initially to FIGS. 1 and 2, there is shown a typical food product forming device 10 for providing a substantially cylindrical outside wall on food product slurries or mixtures 12 conducted through and successively discharged from a nozzle 14 which extends from food product forming apparatus 16, the nozzle 14 being threadably engaged therewith by way of an internally threaded collar 18. Nozzle 14 includes an inner tubular member 20 for conducting the slurry 12 from the apparatus 16 toward a discharge orifice 22 at the base of the nozzle. This orifice 22 is bounded by a cutter disc 24 which extends laterally a particular distance below the bottom opening of the tubular member 20.

Figure 3:
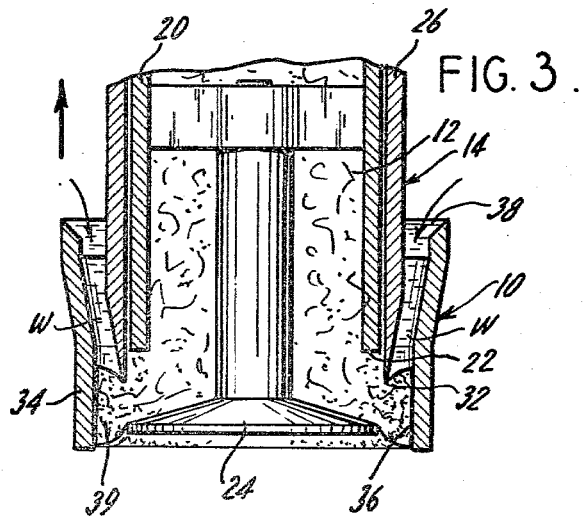
FIG. 3 is a view of the lower portion of the nozzle in FIG. 2, showing the cutter sleeve and the forming device in an upward position whereat the slurry is discharged through the nozzle opening against the forming device in accordance with the present invention.
Figure 4:
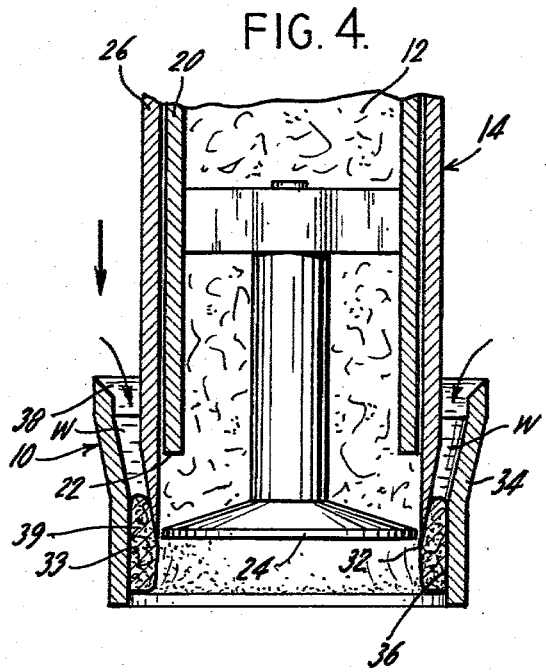
FIG. 4 is a view similar to FIG. 3, showing the cutter sleeve and forming device moved to a downward position to sever the food product slurries when formed by the device according to the present invention.

Mounted for sliding movement over the outer surface of the tubular member 20 is a cutter sleeve 26. Sleeve 26 is reciprocally movable over the tubular member 20 by way of a pivoted rocker arm 28, which itself pivotally engages a grooved collar 30 formed about the upper portion of the cutter sleeve 26 (see FIG. 1). Cutter sleeve 26 has an inwardly tapered lower cutting edge 32 which operates to sever slurries of the food product when discharged through the orifice 22 so that formed food products 33 can be released from the nozzle, as illustrated in FIGS. 3 and 4. Accordingly, it will be understood that when the cutter sleeve 26 is in an upward position (FIG. 3), the slurry 12 is free to be discharged outwardly and sideways through the orifice 22 in response to pressure transmitted from the food product apparatus 16 to the slurry 12 through the inner tubular member 20. When the cutter sleeve 26 is moved toward a downward position (FIG. 4), its cutting edge 32 severs the discharged slurry and separates it from the remainder of the slurry 12 contained within the nozzle 14.

Forming device 10 includes a sleeve-like member 34 which has a substantially cylindrical inner wall 36 formed to surround the lower portion of nozzle 14 in radially spaced apart relationship and in axial alignment therewith, as shown in FIG. 2.

The lower portion of the forming device 10 which includes the inner wall 36 is maintained substantially parallel to the nozzle discharge orifice 22. As shown in FIG. 2, the upper portion of the forming device 10 is tapered in conformance with the tapered cutting edge 32 of the cutter sleeve 26, and is securely joined to the sleeve 26 above the edge 32 by one or more spacer elements 38 which are each welded to both the forming device 10 and the outside of the cutter sleeve 26, respectively.

FIGS. 3 and 4 illustrate the operation of the forming device 10 to provide a substantially cylindrical outside wall on the food product slurry or mixture 12 when outwardly discharged from the orifice 22 of the nozzle 14. When the cutter sleeve 26 is in the upward position (FIG. 3), the inner wall 36 of the forming device 10 confronts the discharge orifice 22 to define a region 39 in which the slurry 12 is formed as it discharges through the orifice 22 against the device wall 36. As shown, the region 39 is unobstructed in a direction parallel to the wall 36 above and below the vicinity of the orifice 22. Depending upon the relative viscosity of the slurry 12, it is preferred that the lower portion of the device 10 be located so that the inner wall 36 overextends the orifice 22 by a particular distance. This distance is preferably varied in inverse relationship with the viscosity of the slurry 12. At any rate, when the cutter sleeve 26 is in the upward position of FIG. 3, the inner wall 34 should overlie the discharge orifice 22 by an amount sufficient to contain substantially all of the discharged slurry within the region 39, so that as the device 10 provides the outside wall over the slurry, the slurry will not flow off the wall 36 because of gravity or other means.

In FIG. 4, the forming device 10 is moved together with the cutting sleeve 26 to a downward position whereat cutting sleeve 26 closes off the discharge orifice 22, and severs the slurry contained within the region 39 from the remainder of the slurry 12 within the nozzle 14. It will be seen that the inner wall 36 continues to provide the outside wall on the formed food product 33 as the product 33 is urged downwardly by the sleeve 26 and the forming device 10.

A liquid wash W, which can be a gel forming agent such as calcium chloride for reacting with a gel forming material (sodium alginate, for example) contained within the slurry 12, is circulated between the device inner wall 36 and the cutter sleeve 26 down toward the food product forming region 39, as indicated by the arrows in FIG. 1. The wash W thereby lubricates the wall and sleeve surfaces so that the formed food product 33 does not significantly adhere thereon, and is free to fall away when severed, thereafter to be fried or otherwise prepared prior to serving. It should be noted that the forming device 10 not only provides a substantially cylindrical outside wall on the food product 33 by way of its correspondingly shaped inner wall 36, but also enables the inside wall of the food product 33 to be formed substantially cylindrically. This is at least partly due to the fact that the food product slurry 12 is confined within the region 39 during the forming and severing operation performed thereon. Accordingly, as the cutter sleeve edge 32 descends along a straight path toward the edge of the cutter disc 24, the sleeve 26 and disc 24 together operate to provide an inside wall on the food product 33 which closely conforms to the path of the sleeve edge 32 therethrough, as long as the slurry 12 is maintained at a sufficient viscosity. Therefore, food products such as onion rings can be produced with a substantially rectangular cross section when using the device 10 in accordance with the present invention.

Referring now to FIGS. 5 to 7, another embodiment of the forming device of the present invention will be explained. In this arrangement, sleeve-like member 34' can be adjustably located at a desired confronting relationship laterally of the nozzle discharge orifice 22 to accommodate various food product slurries over a range of viscosity levels.

The sleeve member 34' is joined to the cutter sleeve 26 by way of a split ring collar 40 rather than spacer elements 38 of FIGS. 2 to 4. The collar 40 is located remotely above the sleeve member 34' and is joined thereto by way of one or more rod-like members 42 which operate to maintain the sleeve member inner wall 36' in properly spaced relationship with respect to the lower portion of the nozzle 14. The collar 40 has a sufficiently large opening therein to slideably move along the outer surface of the cutter sleeve 26 to a desired location. The collar is secured to the sleeve 26 by way of a screw 44 which, when tightened, draws the split collar 40 tightly about the outer surface of the cutter sleeve 26 (FIG. 7).

Operation of the forming device 10' is similar to that of the device 10 explained in connection with FIGS. 1 to 4. However, the sleeve 34' is first located at a desired lateral position relative to the nozzle discharge orifice 22 by sliding the loosened ring collar 40 over the cutter sleeve 26 in order to bring the sleeve member 34' at the desired position. Screw 44 is then tightened through the collar 40 to firmly secure the collar against the cutter sleeve 26.

It will be appreciated that the embodiment of FIGS. 5 to 7 facilitates easy attachment and removal of the device 10' to the nozzle 14 on existing food product apparatus 16, as well as adjustment of device 10' to a desired overlap of the nozzle orifice 22 by the sleeve 34' in order to obtain substantially cylindrical walls on each of the formed food products.

The embodiment of FIGS. 5 to 7 also realizes a less inhibited flow of the liquid wash W (FIG. 4) between the cutter sleeve 26 and the device sleeve member 34', as the spacer elements 38 are no longer present to interrupt the liquid wash as it flows to envelop the discharged food slurries. This increased flow of the liquid wash provides an even lubrication on the surfaces of the cutter sleeve 26 and the inner wall 36' of the sleeve member 34', thereby allowing the formed food products to more freely fall from the nozzle 14 as each of them are severed from the slurry 12 within the nozzle.

As will be readily apparent to those skilled in the art, the present invention may be realized in other specific forms without departing from its spirit or essential characteristics. The present embodiments are, therefore, to be considered as illustrative and not restrictive, the scope of the invention being indicated by the claims rather than by the foregoing description, and all changes which come within the meaning and range of equivalents of the claims are therefore intended to be embraced therein.

What is claimed is:

1. In a food product apparatus of the type which includes a nozzle having an axial bore extending longitudinally therethrough for conducting a slurry of said food product delivered at one end of said nozzle to an opening at the other end of said nozzle, said opening being constructed and arranged for radially outwardly discharging given amounts of said slurry, the improvement comprising a forming device constructed and arranged in spaced-apart relationship with said nozzle, said device having an inner wall the axis of which is aligned with the axis of said nozzle for forming corresponding outside walls on the exteriors of each of said given amounts of discharged slurry to form said food product, said inner wall radially spaced from and confronting said opening to define a region adjacent said opening and extending radially outwardly from said opening toward said inner wall, said inner wall being constructed and arranged so that said region is substantially unobstructed in a direction parallel to said wall both axially above and below said opening, wherein each given amount of discharged slurry is substantially entirely connected within said region when said outside wall is formed thereon, said food product being free to be removed from both said nozzle and said device in said parallel direction.

2. The improved food product apparatus of claim 1, wherein said inner wall is spaced apart from said nozzle a sufficient distance to enable a liquid wash directed between said nozzle and said inner wall to envelope each of said given amounts of slurry when said outside wall is formed on said slurry.

3. The improved food product apparatus of claim 1, wherein said inner wall extends substantially normally to said opening when said given amounts of discharging slurry are discharged from said opening.

4. The improved food product apparatus of claim 1, wherein said forming device is mounted on said nozzle.

5. A forming device for forming a substantially outside wall on the exteriors of each of a plurality of food products formed from a slurry successive discharged radially outwardly in given amounts, respectively, from an opening at one end of an elongated nozzle, said device including a member having a cylindrical inner wall, coaxial with the axis of said nozzle, for forming said outside wall on each of said discharged food products, said device being constructed and arranged for mounting on said nozzle so that the inner wall of said member is radially spaced from and confronts said opening to define a region adjacent said opening and extending radially outwardly from said opening toward said inner wall, said inner wall being constructed and arranged so that said region is substantially unobstructed in a direction parallel to said wall both axially above and below said opening, wherein each given amount of discharged slurry forming said food product is substantially entirely contained within said region when said outside wall is formed thereon, said formed food product being free to be removed from said nozzle and said device in said parallel direction.

6. A forming device as defined in claim 5, further including a mounting collar for securing said device to said nozzle at a desired location thereon.

7. A forming device as defined in claim 6, further including means for joining said member to said mounting collar for maintaining said member spaced apart from said nozzle.

8. A forming device as defined, in claim 7, wherein said joining means maintains said member a sufficient distance from said nozzle to enable each of said successive food product slurries to be enveloped by a liquid substance directed between said nozzle and the inner wall of said member when said side wall is formed on each of said slurries.

9. The improved food product apparatus of claim 2, said inner wall being generally funnel-shaped in cross-section with the wide part of said funnel being upstream of said opening for aiding said liquid wash directed between said nozzle and said inner wall in enveloping each of said given amounts of slurry when said outside wall is formed on said slurry.

* * * * *